United States Patent
Eckardt et al.

(10) Patent No.: US 9,396,821 B2
(45) Date of Patent: Jul. 19, 2016

(54) SAFETY SYSTEM FOR A NUCLEAR PLANT AND NUCLEAR PLANT WITH A SAFETY SYSTEM

(75) Inventors: Bernd Eckardt, Bruchköbel (DE); Norbert Losch, Offenbach (DE)

(73) Assignee: Areva GmbH, Erlangen (DE)

( * ) Notice: Subject to any disclaimer, the term of this patent is extended or adjusted under 35 U.S.C. 154(b) by 1015 days.

(21) Appl. No.: 12/813,936

(22) Filed: Jun. 11, 2010

(65) Prior Publication Data

US 2010/0296619 A1    Nov. 25, 2010

Related U.S. Application Data

(63) Continuation of application No. PCT/EP2008/010196, filed on Dec. 2, 2008.

(30) Foreign Application Priority Data

Dec. 11, 2007  (DE) .......................... 10 2007 059 827

(51) Int. Cl.
*G21C 9/00* (2006.01)
*G21C 9/06* (2006.01)
*G21C 19/317* (2006.01)

(52) U.S. Cl.
CPC ................ *G21C 9/06* (2013.01); *G21C 19/317* (2013.01); *G21Y 2002/201* (2013.01); *G21Y 2002/206* (2013.01); *G21Y 2004/30* (2013.01); *Y02E 30/40* (2013.01)

(58) Field of Classification Search
USPC ........... 376/300, 301, 279, 283; 423/210, 248
See application file for complete search history.

(56) References Cited

U.S. PATENT DOCUMENTS 3,168,445 A * 2/1965 Ziegler et al. ................. 376/283
4,891,181 A * 1/1990 Heck ............................. 376/300

(Continued)

FOREIGN PATENT DOCUMENTS

CN  1345451 A   4/2002
CN  1452591 A   10/2003

(Continued)

OTHER PUBLICATIONS

Kumar et al.: "Hydrogen Combustion Mitigation Concepts for Nuclear Reactor Containment Buildings" Nuclear Safety, vol. 33, No. 3, Jul.-Sep. 1992, pp. 398-414, XP00037616.

(Continued)

*Primary Examiner* — Marshall O'Connor
(74) *Attorney, Agent, or Firm* — Laurence A. Greenberg; Werner H. Stemer; Ralph E. Locher (57) ABSTRACT

A safety system for a nuclear plant includes a plurality of catalytic recombiner elements each triggering a recombination reaction with oxygen when hydrogen is entrained in an onflowing gas flow, so that reliable elimination of the hydrogen from the gas mixture is ensured with an especially high degree of operational safety even based on comparatively extreme conditions or scenarios of the aforementioned type. The recombiner elements and/or the flow paths each connecting two recombiner elements on the gas side are configured in such a way that a pressure pulse triggered in the gas medium by an ignition during the recombination reaction in a first recombiner element triggers a gas displacement process having a flow rate of at least 5 m/s in the onflow region of a second, adjacent recombiner element. A nuclear plant with a safety system is also provided.

9 Claims, 3 Drawing Sheets

(56) References Cited

U.S. PATENT DOCUMENTS

| | | | |
|---|---|---|---|
| 5,492,686 A * | 2/1996 | Hill | 423/580.1 |
| 5,592,521 A | 1/1997 | Hill | |
| 6,385,270 B1 * | 5/2002 | Eckardt et al. | 376/300 |
| 6,942,846 B1 | 9/2005 | Eckardt et al. | |
| 7,132,085 B2 * | 11/2006 | Eckardt | 422/168 |
| 2001/0055360 A1 | 12/2001 | Ogino | |
| 2002/0076358 A1 | 6/2002 | Eckardt et al. | |
| 2003/0077202 A1 | 4/2003 | Furkasov et al. | |
| 2009/0067565 A1 | 3/2009 | Eckardt et al. | |
| 2012/0140864 A1 | 6/2012 | Farawila et al. | |

FOREIGN PATENT DOCUMENTS

| | | |
|---|---|---|
| CN | 1864544 A | 11/2006 |
| CN | 1864844 A | 11/2006 |
| CN | 2901504 Y | 5/2007 |
| DE | 4125085 A1 | 2/1993 |
| DE | 102006010826 A1 | 9/2007 |
| EP | 0388955 A2 | 9/1990 |
| EP | 0 289 907 B1 | 7/1992 |
| EP | 0 596 964 B1 | 1/1996 |
| EP | 0779627 A1 | 6/1997 |
| RU | 2222060 C2 | 1/2004 |
| RU | 2226724 C2 | 4/2004 |
| WO | 0019449 A2 | 4/2000 |
| WO | 0060608 A1 | 10/2000 |
| WO | 2006078276 A2 | 7/2006 |

OTHER PUBLICATIONS

International Search Report dated Jul. 3, 2009.

* cited by examiner

SAFETY SYSTEM FOR A NUCLEAR PLANT AND NUCLEAR PLANT WITH A SAFETY SYSTEM

CROSS-REFERENCE TO RELATED APPLICATION

This application is a continuation, under 35 U.S.C. §120, of International Patent Application No. PCT/EP2008/010196, filed Dec. 2, 2008; this application also claims the priority, under 35 U.S.C. §119, of German Patent Application DE 10 2007 059 827.2, filed Dec. 11, 2007; the prior applications are herewith incorporated in their entirety.

BACKGROUND OF THE INVENTION

Field of the Invention

The invention relates to a safety system for a nuclear plant with a number of catalytic recombiner elements each triggering a recombination reaction with oxygen when hydrogen is entrained in an onflowing gas flow. The invention also relates to a nuclear plant with a safety system.

In a nuclear plant, in particular in a nuclear power station, allowance must be made for the formation and release of hydrogen gas and carbon monoxide within the safety containment or containment surrounding the reactor core in the event of malfunction or accident situations in which heating of the core, for example, can cause oxidation of zirconium to occur. In particular, after a malfunction in which coolant is lost, large amounts of hydrogen may be released in such a case. That can produce explosive gas mixtures within the containment. Unless countermeasures are taken, the containment atmosphere in that case becomes so rich in hydrogen that an accidental ignition caused by the combustion of a relatively large amount of hydrogen might compromise the integrity of the safety containment.

Various devices or methods have been discussed to prevent the formation of explosive gas mixtures of that type in the containment of a nuclear power station. Examples of those include devices such as catalytic recombiners, catalytically and/or electrically operated ignition devices or the combination of the two aforementioned devices, as well as methods of permanent inerting of the containment.

When an ignition system is used for eliminating the hydrogen from the atmosphere of the containment, reliable recombination of the hydrogen with oxygen is to be achieved through the use of controlled combustion. That should reliably prevent a significant build-up of pressure as a consequence of virulent burning of hydrogen. An ignition system of that type is conventionally constructed in that case in such a way that an ignition of the hydrogen is to be triggered as soon as the lower limit of a gas mixture is exceeded, i.e. in a gas mixture having a comparatively low hydrogen concentration of for example 4% by volume of hydrogen, or when an inerting limit of approximately 55% by volume of steam is undershot.

An ignition system known from European Patent EP 289 907 B1, corresponding to U.S. Pat. No. 4,891,181, for the controlled ignition of a hydrogen-containing gas mixture, includes a spark igniter which can be powered through an integrated energy accumulator. The ignition system in that case is provided with a stand-alone energy accumulator, so that no feed lines are required. The energy accumulator provided in that case is, in particular, a dry battery. Nevertheless, due to the capacity of the integrated energy accumulator, that ignition system is suitable merely for a limited running time.

During the course of a malfunction with subsequent release of hydrogen, a controlled ignition of the hydrogen is only possible to a limited extent, in particular in the event of premature excitation of the spark igniter. In addition, that ignition system also responds to the release of hydrogen only once an ignition delay time has elapsed. Long-term operation of the ignition system, which would be required to cover all conceivable malfunction scenarios, is also only possible with restrictions. Furthermore, precautionary excitation of the ignition system in anticipation of an imminent malfunction from an external station, such as for example the control room of a power plant, is not possible.

In addition, safety systems based exclusively on the use of methods for igniting hydrogen, for example in the form of ignition plug systems, are subject to the additional limitation that in steam-inert situations hydrogen degradation cannot be operated. Accordingly, in systems of that type, hydrogen formed in the safety containment can be completely burned only after appropriate steam condensation. In the event of hydrogen enrichment in the steam, that can lead to comparatively large amounts of hydrogen or high concentrations of hydrogen which are then burned as a consequence of the ignition in a comparatively short time, in such a way that uncontrolled sequences of reactions might occur. In addition, systems based exclusively on ignition must also take into account the fact that in so-called station black-out scenarios, i.e. scenarios in which the supply of energy is lost altogether within the containment, the ignition might completely fail.

Alternatively or additionally, a safety system can therefore have so-called passive autocatalytic recombiners disposed in the safety containment or containment of a nuclear plant. Passive autocatalytic recombiners conventionally include suitable catalyst elements which catalytically trigger a recombination reaction with oxygen when hydrogen is entrained in an onflowing gas flow. The catalyst elements in that case are conventionally provided with a surrounding housing, with the housing being configured in the manner of a chimney in such a way that the chimney effect automatically produces a convection current within the housing, so that the gas mixture is reliably guided along the respective catalyst element and the catalytic recombination reaction can thus be maintained. The actual catalytic elements are disposed within the respective catalytic recombiner element predominantly vertically and largely in parallel in that case in order to generate and to promote lift between the elements. Since hydrogen is formed in the gas mixture of the containment, those devices conventionally start up automatically and oxidize the hydrogen with oxygen contained in the atmosphere, so that effective hydrogen degradation can be achieved without ignition, including in particular under steam-inert conditions or in gas mixtures just above the ignition limit.

Nevertheless, even in systems of that type, locally or globally critical concentrations and amounts of hydrogen formation can be reached in postulated malfunction scenarios with high hydrogen release rates and at the same time low concentrations of steam in the safety containment.

Since ignitions in recombiners have only been observed haphazardly to date, under different atmospheric conditions, such as hydrogen concentrations and steam contents, etc., devices of that type neither reliably prevent undesired ignitions nor ensure the ignition function. Measures to completely prevent catalyst ignitions, such as for example different coating densities or diffusion inhibition layers or the like, have not led to the reliable exclusion of ignitions either. Even if that had been shown to be the case, it is not generally possible to rule out the risk of accidental ignitions caused by other conceivable inconstant ignition sources in the containment.

In order to ensure the safety-related construction of a containment, if catalytic recombiners are used, the maximum concentration in the safety containment occurring in the event of a hydrogen overfeed is therefore determined and an ignition, with accordingly long flame acceleration paths through the safety containment, is assumed under those conditions. Rapid deflagrations, possibly including deflagration-detonation transitions, are likely to form in ignition scenarios of that type. In order to be able to suitably compensate even for the considerable loads and differential pressures of up to several bar theoretically occurring in that case by way of the structural layout of the containment, the corresponding structures of the containment as well as the built-in parts provided therein are conventionally constructed in a correspondingly solid manner. A modified construction for a safety system would therefore be desirable, in which even under the aforementioned conditions, excessive enrichment of hydrogen in the atmosphere can be ruled out from the outset and the aforementioned ignition or detonation scenarios could thus be reliably prevented.

In order to be able to accommodate such endeavors, it is also possible to provide combined systems including both igniters and catalytic recombiners. A combined catalyst ignition system for the recombination of hydrogen in a gas mixture is, for example, known from European Patent EP 596 964 B1, corresponding to U.S. Pat. Nos. 5,492,686 and 5,592,521. In that system, during the catalytic recombination of hydrogen, the heat obtained from a catalyst body is fed to an ignition device, where it is used for the direct ignition of non-depleted hydrogen-containing gases. However, in a combined catalyst ignition system of that type, the hydrogen is ignited only once an ignition delay time has elapsed after the release of the hydrogen. That is to say, after the first release of the hydrogen, it takes a certain time for the catalyst body and the adjoining ignition system to warm up sufficiently to allow an ignition of the hydrogen. In rapid gas displacement processes within the containment, that time delay means that the hydrogen is ignited only once comparatively high hydrogen concentrations have been reached. However, once the system as a whole has warmed up, early ignition occurs in the non-catalytic parts even when the lower ignition limit is exceeded.

Other combined systems with catalytic recombiners and with a large number of autonomous spark igniters, in which the ignition is introduced independently of the catalytic recombination in the ignition devices, are comparatively complex as a result of corresponding adaptation of the systems to each other, and the handling of disadvantageous effects at an incorrect ignition frequency is particularly problematic. In that case too, the principle applies that early individual ignitions are triggered with corresponding gas displacement processes without allowing effective counter ignitions so as to ensure short flame acceleration paths, because there are no high-temperature regions.

BRIEF SUMMARY OF THE INVENTION

It is accordingly an object of the invention to provide a safety system for a nuclear plant and a nuclear plant with a safety system, which overcome the hereinafore-mentioned disadvantages of the heretofore-known devices of this general type and which ensure reliable elimination of hydrogen from a gas mixture with an especially high degree of operational safety, even based on comparatively extreme conditions or scenarios of the aforementioned type.

With the foregoing and other objects in view there is provided, in accordance with the invention, a safety system for a nuclear plant with a plurality of catalytic recombiner elements each triggering a recombination reaction with oxygen when hydrogen is entrained in an onflowing gas flow, the recombiner elements also being suitable as ignition elements. The recombiner elements and the flow paths each connecting two recombiner elements on the gas side are configured in such a way that a pressure pulse triggered in the gas medium by an ignition during the recombination reaction in a first recombiner element in the onflow region of a second adjacent recombiner element triggers a gas displacement process which precedes a flame front, has a flow rate of at least 5 m/s and causes intensified heating of the second recombiner element and as a result an ignition of the gas flow even before the flame front reaches the second recombiner element. The flow rate which is desired in terms of design in the onflow region should preferably exceed twice the onflow rate prevailing in a convection mode in this case.

The invention starts in this case from the consideration that reliable elimination of the hydrogen under the aforementioned possibly extreme conditions can be achieved, while reliably avoiding the formation of critical concentrations and while consistently excluding detonation scenarios, by supplementing a system based substantially on a catalytic recombination in a particularly suitable manner with purposefully introduced ignitions. For this purpose, the ignition system should also be embodied completely or at least largely passively so as to adhere to particularly high operational safety standards and also to control black-out scenarios. Such purposeful supplementing of a system based on catalytic recombiners with suitable ignition mechanisms can be achieved by using the heat released during the catalytic recombination locally in the region of the catalyst elements in a particularly suitable manner for the purposeful introduction of ignitions.

The system should be constructed in this case in its entirety in particular in such a way that even in dry scenarios, with a moderate release of hydrogen and comparatively low steam contents, a flameless catalytic hydrogen degradation is introduced prematurely and continued even into concentrations which are ignitable, but non-critical, for example of 6 to about 8% by volume of hydrogen. This flameless recombiner operation is to be extended at higher steam concentrations of for example >30% by volume to a hydrogen concentration of approximately >8% by volume, and at >40% by volume preferably to a hydrogen concentration of about 10% by volume and higher. This prevents the occurrence of any ignition whatsoever in a large number of scenarios.

It is only in more extreme scenarios, in particular when relevant amounts of hydrogen having concentrations above about 8% by volume occur at a low steam content, but in any case at hydrogen concentrations of more than 10% by volume, that a further rise in concentration should be prevented as a precaution and an ignition should be triggered in the various spatial regions of the safety containment in a purposefully automatic manner. The aforementioned limit concentrations relate in this case in particular to atmospheric temperatures of up to approximately 100° C. At higher temperatures, it should also be borne in mind that the ignition field spreads to the lower and upper ignition limit of a hydrogen mixture, thus allowing even earlier safe ignition.

In order to purposefully ensure this, provision is now made to purposefully set the onflow behavior of a gas flow in the inflow region of the respective catalytic elements through the use of a suitable structural positioning of the catalyst elements relative to one another and a suitable structural layout, in particular with regard to the setting of the flow paths and dimensioning of the components provided for this purpose.

This is based on the finding that in a catalytic recombiner of the aforementioned type, in which, for example as a consequence of chimney effects or the like, the gas flow is guided along the catalytic elements at a specific flow rate and the recombination reaction is thus introduced and maintained and the hydrogen content of the gas flow is depleted directly adjacent the catalytically active surfaces in the state of equilibrium of the catalyst. This is a consequence of the recombination reaction which leads, directly in the border region of the catalytically active surface with the gas flow which is guided past, due to the reaction of the hydrogen entrained there with oxygen, to a local impoverishment of the hydrogen content in direct proximity to the catalyst. The heat which is generated by the catalytic recombination reaction and heats the catalyst accordingly can therefore lead in a state of equilibrium of this type to an ignition of the circulating gas flow only when even the impoverished zone still contains a hydrogen content of the gas mixture that is sufficient for ignition with regard to the temperature prevailing in the catalyst element.

Instabilities are therefore particularly likely to occur in systems of this type when ignition takes place locally within the containment at any point and for any reason, causing a flame front to spread along the flow paths in the containment, for example as a result of a desired ignition through the use of igniters, as a result of ignition through the use of other electrical devices, as a result of an initial ignition in one of the recombiners or else as a result of transient gas feeding processes such as for example bursts of steam in the event of cooling water being fed suddenly onto superheated built-in parts. As soon as this flame front reaches another recombiner, the ignition temperature required for igniting the gas mixture in the ambient region of this second recombiner, i.e. in the aforementioned impoverishment zone, is locally exceeded and the ignition is also initiated in this spatial region. Precisely such crosstalk or cross feed of ignition effects as a consequence of spreading caused by travelling flame fronts can lead to undesired flame accelerations and the aforementioned instabilities which in the least favorable case might lead to a detonation or the aforementioned deflagration-detonation transition.

In order to purposefully counteract these effects, the flow paths between individual recombiner elements and/or the recombiner elements themselves as a precaution should therefore be purposefully constructed to trigger an ignition even in the ambient region of the second recombiner even before the flame front has reached the first recombiner, so that the ignition in the ambient region of the second recombiner can proceed in a correspondingly controlled manner while avoiding mutual influences. In order to achieve this, the flow paths between the individual recombiners should be constructed in such a way that an ignition in the respectively second recombiner is triggered simply due to a pressure pulse or a gas displacement process preceding the aforementioned flame front. This is possible by purposefully using the aforementioned pressure pulse or gas displacement process to break up the aforementioned impoverishment zone in the immediate environment of the respectively second catalyst element, in such a way that gas contents having a non-depleted hydrogen content can enter into direct contact with the respective catalyst element. In situations of this type, the temperature which is in any case set in the catalyst element may, due to the non-depleted hydrogen content, itself be sufficient as the ignition temperature, so that the ignition which is triggered as a result can be introduced in a controlled manner, independently of the flame front and thus without the aforementioned avoidable crosstalk or cross feed effects. The energy from the incipient combustion is thus utilized, by purposefully partial introduction into a temperature-regulated passive catalytic device, for counter ignition, alleviation of explosions or extinguishing.

In order to ensure this, the recombiner elements should be suitably positioned relative to one another and/or joined together through suitably predefined and structured flow paths in such a way that the flow rates, generated by the aforementioned gas displacement processes, of the gas flow reaching the second recombiner, are sufficient to break up the aforementioned impoverishment zone and to guide the mixture having a non-depleted hydrogen content in direct proximity to the catalyst element.

Furthermore, the layout of the recombiner configuration advantageously also takes into account the concentration-dependent flame path directions. Vertically upwards is the basically preferred flame path in this case at low concentrations. A slightly higher concentration is possible in horizontal flame propagation and even approximately 2-3% by volume higher minimum concentrations are possible in downward flame propagation.

A selection of the flow rate, which is suitable in terms of design, including a gas displacement process in the onflow region of a second, adjacent recombiner element, caused by a pressure pulse triggered by an ignition during the recombination reaction in a first recombiner element in the gas medium, is provided as a suitable design criterion for the overall scheme.

Advantageously, in the manner of a suitable design criterion for the overall system, the flow rate predefined for the triggered gas displacement process is a rate causing the aforementioned gas layering in the immediate environment of the respective catalyst element to be broken up with particularly high reliability. This can be achieved by a minimum rate, which is predefined as a result of the structure, of just 5 m/s, corresponding in particular to more than twice the onflow rate in convection mode. However, for this purpose, at least a nominal rate of 10 m/s is advantageously predefined as the flow rate. The method also provides higher pressures and steam concentrations and more, very reliable spontaneous ignitions, even in the event of high gas velocities, for example of >50 m/s. The cooling effect which occurs in this case, caused by the large amounts of inflowing cooler ambient gases and the ambient conditions, can be reliably compensated for by way of an appropriate regulation of the temperature of the masses in the devices.

Examples of suitable parameters, which can in particular be used to influence the desired, structure-induced onflow rate, include in particular direct configurational features of the catalytic recombiner elements per se, i.e. for example the routing of the channels within the respective housing, the channel cross sections provided in this case, channel lengths of the individual elements and the like, but also the type and shape of the channel routing (rectilinear or curved, etc.) and also suitable restriction measures and the like. However, alternatively or additionally, appropriate adaptation can also be implemented by similarly influencing the flow paths between individual recombiner elements.

In this case, the flow can be purposefully continued in the combustion processes through building and component structures in the safety containment or else in partly or fully closed channel or pipeline systems. Additional channel or pipe systems of this type can also be utilized to initiate a desired ignition. In this case, this system is beneficially also equipped with a pressure pulse generator or memory which triggers the gas displacement process in the recombination devices by actuation for the purposes of ignition.

The recombiners are advantageously disposed in the containment or reactor safety containment in accordance with specific distance, volume and building structure criteria benefiting the ignition mechanism which is aimed for. The recombiners are, for example, beneficially disposed more densely, i.e. at a content of for example at least 70%, in a range of ¼ to ¾ of the containment building height. The recombiners are preferably also disposed at an increased density in the potential hydrogen release region, close to the main circuit, in a containment volume of approximately 20-50% of the total volume and also in more markedly spatially divided regions. Beneficially, one recombiner element is provided in this case for each 300 to 1,500 m³ of building volume. Furthermore, a distance criterion of <15 m, preferably <10 m, in consideration of the building structure, is in this case advantageously applied between the units in order to minimize flame acceleration effects. The indicated distances in this case denote, in particular, the length of the gas flow path provided between two recombiner units.

Since flame propagation is predominantly generated in the ascending direction in the selected concentration range, the recombiners are preferably disposed above the main circuit in order to ensure a particularly efficient implementation of the method.

On the other hand, much greater distances between the recombiner elements of up to 25 m, preferably <15 m, are preferably provided in the outer, freer region of the safety containment, in particular due to the much lower concentration gradients there and the virtual absence of turbulence generators. Furthermore, a building volume of 1,000 to 5,000 m³ for each recombiner is preferably selected in this case.

Furthermore, in accordance with this method, the recombiners are preferably disposed in the region of the main circuit as a continuous chain and also, so as to assist convection, into the region of the local and global flow paths.

Additionally, the recombiners are advantageously placed while taking into consideration the spatial geometries and the degree of blocking in the respective flow paths, noting that it is possible that blockings might occur in particular as a result of further components or built-in parts disposed there. Flame and volume propagation effects, such as for example approximately two or three-dimensional expansion and also the spatial configuration of turbulence generators and damping cooling effects of building structures, must generally be taken into account in this regard.

In spaces which only widen out slightly, a larger distance between recombiners of up to 10 m, but in markedly widening spaces a smaller distance between recombiners of <7 m, should preferably be adhered to.

Regions having spatial blocking factors of >0.2 to <0.5, in combination with the selected average concentration ranges, are particularly beneficial for the recombiner configuration. The recombiners are advantageously disposed in this case in proximity to velocity-relevant spatial overflow regions before or after overflow openings, in particular in the inflow or free beam region or in areas of increased turbulence. The premature counter ignition reliably prevents marked flame acceleration, ranging up to rapid deflagrations, precisely at these slower flame velocities in this particularly critical flame acceleration range. In the case of very marked spatial blocking of >0.5, the recombiners are preferably disposed after the obstacle and/or outside the core jet region of the flow.

In this case, the next recombiner is beneficially placed in longer start-up sections before a relevant spatial blocking, and in shorter start-up sections also in the outflow region after the spatial blocking.

In a further advantageous configuration, the safety system is also constructed for a particularly effective incorporation of the targeted ignition that is provided, which is desired as a consequence of the heating which occurs and the excitation of the gas mixture by the pressure pulse. In consideration of the correlation between the hydrogen concentration and the associated ignition temperature, in a particularly advantageous configuration, the system is constructed for an ignition in the circulating gas flow to be triggered in the natural convection mode of the recombiner element or each recombiner element for this purpose, only when the content of entrained hydrogen is at least 6%, preferably at least 8%, under atmospheric conditions and at an ambient temperature of up to approximately 100° C. For this purpose, in order to construct the respective components, in particular, the thermal inertia of the catalyst elements and the cooling effect of a gas flow sweeping along the surface may be taken into account, with it being possible for the temperature, which is set based on the structure, of the respective catalyst element to be altered in particular by varying the mass, thickness or lateral expansion of the actual catalyst body.

In a further, particularly advantageous configuration, a building spray system is provided, in particular for steam condensation in the containment atmosphere as required. In specific cases of operation, this combination with a building spray system allows the containment atmosphere to be homogenized and the $H_2$ and/or steam content to be purposefully reduced in an adapted and synchronized manner.

During purposeful condensation of steam and upon reaching the non-inert concentration range of, for example, approximately <50 to 55% by volume of steam and $CO_2$, at concentrations which are now largely homogeneous, the ignition can thus likewise be reliably triggered close to the inerting limit, even at relatively high concentrations of hydrogen, in the region of slow deflagration with counter ignition.

An intensive mixing of the atmosphere, due to spraying on one hand and issuing recombiner convection currents on the other hand, and also a reduction of the hydrogen content at the same time, can be achieved in the steam-inert range by combining the recombination devices disposed in various spatial regions with the operation of a containment spray system. In particular, this blends possible critical high-concentration clouds having a relevant potential for flame acceleration in the short term with the remaining atmosphere and furthermore brings the various high-temperature target ignition zones to a more uniform level. This allows particularly pronounced high temperatures in the target ignition zones disposed accordingly in the building, of >700° C., preferably >800° C., to be set. Due to the pronounced high-temperature zone, the method provides very reliable spontaneous ignitions even in the event of high gas velocities of for example >50 m/s and more. The cooling effect which occurs in this case, caused by the cooler ambient atmosphere flowing in at high volume, can be reliably compensated for by the present temperature regulation of the masses.

Furthermore, appropriate configuration of the operation of the spray system allows the condensation effect to be slowed down accordingly as required, for example at a steam condensation rate of <1% by volume/min, thus ensuring atmospheric homogenization and hydrogen degradation in advance. At appropriately high temperatures, preferably >800° C. in the target ignition zones of the correspondingly disposed recombiners, the spraying can also be introduced directly for the purposes of deinerting and, in particular if there is an increased probability of leakage of the containment or on approaching the excess pressure design values, the containment pressure can be rapidly lowered and also the particularly reliable effect of the method can be ensured with the introduction of slow deflagrations with counter ignition.

The advantages achieved with the invention reside in particular in the fact that the structural configuration of the recombiner devices and/or the flow paths connecting them ensures that the pressure pulse or gas displacement process reaching one recombiner element, as a consequence of an ignition in another recombiner element, generates such high gas flow velocities in the inflow region of the recombiner element that the gas layer which is located in direct proximity to the catalytic surface and has a depleted or reduced hydrogen content, is broken up.

This now allows gas which is not depleted or is depleted only slightly to obtain direct contact with the comparatively hot surfaces of the catalytic element, so that an ignition is reliably triggered in this spatial region as a result. As a result of the fact that in slow deflagrations, the pressure waves which are generated in this case precede the corresponding flame front with a comparatively long period of oscillation and low amplitude, the gas displacement processes caused as a result thus trigger the ignition in the recombiner before the flame front arrives. The large-scale supply of burnable gas thus leads to overfeeding of the local recombiner devices and to minimization of the depletion in concentration in the boundary layer region of the heating surfaces and at the phase boundary to a disturbance of the boundary surface, so that in addition further convective currents are produced and a reliable ignition is made possible. This ensures a safety ignition of critical regions before a further increase in concentration, with ignitions being reliably triggered in the manner of a domino effect or a domino ignition, starting from a first recombiner device, in adjacent recombiner devices or recombiner devices adjoining on the flow side. This reliably prevents crosstalk or cross feed effects and uncontrolled flow conditions, so that the loads for which allowance must be made are minimized.

Accordingly, the system as a whole can be constructed so as to focus on the catalytic function of the hydrogen degradation, with it being possible for hydrogen degradation to take place exclusively catalytically, without ignitions, in a comparatively large number of scenarios, i.e. in particular at concentrations of less than 8% by volume, preferably less than 6% by volume. At higher concentrations, ignitions and combustion processes take place primarily in the concentration range or start-up range of slow deflagrations, with safe ignition processes being introduced in adjacent devices as a consequence of the gas displacement processes preceding the combustion waves or flame fronts at a distance.

Thus, in the concentration range of, for example, 5 to about 8% by volume, a flameless catalytic oxidation as a result of premature ignition and therefore also an advantageous flameless catalytic degradation at higher concentrations as well as the simultaneous creation of high-temperature regions (>600-900° C.) are in principle made possible. The flameless catalysis region is thus extended over the region which is non-ignitable in any case. In the case of slight differences in concentration, premature individual ignitions are prevented by rapid gas displacement processes, thus allowing, in incoming ignitions, an effective counter ignition for achieving short flame acceleration paths.

The dual effect of the method has proven advantageous in particular in the steam-inert range, at approximately >55% by volume of steam $CO_2$ content, since the flameless oxidation itself allows severe hydrogen degradation and at the same time it becomes possible to create correspondingly high temperature potentials, for example of >600° C., but in particular also temperature potentials of >900° C., at the upper ignition limit which is difficult from the point of view of the ignition conditions. As a result of these high temperatures, the increased dissipation of heat, occurring due to the high steam contents and pressure conditions, in the ignition zone region can be compensated for and safe ignition can take place even under these conditions.

Other features which are considered as characteristic for the invention are set forth in the appended claims.

Although the invention is illustrated and described herein as embodied in a safety system for a nuclear plant and a nuclear plant with a safety system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiment when read in connection with the accompanying drawings.

DESCRIPTION OF A PREFERRED EMBODIMENT OF THE INVENTION

Figure 1:
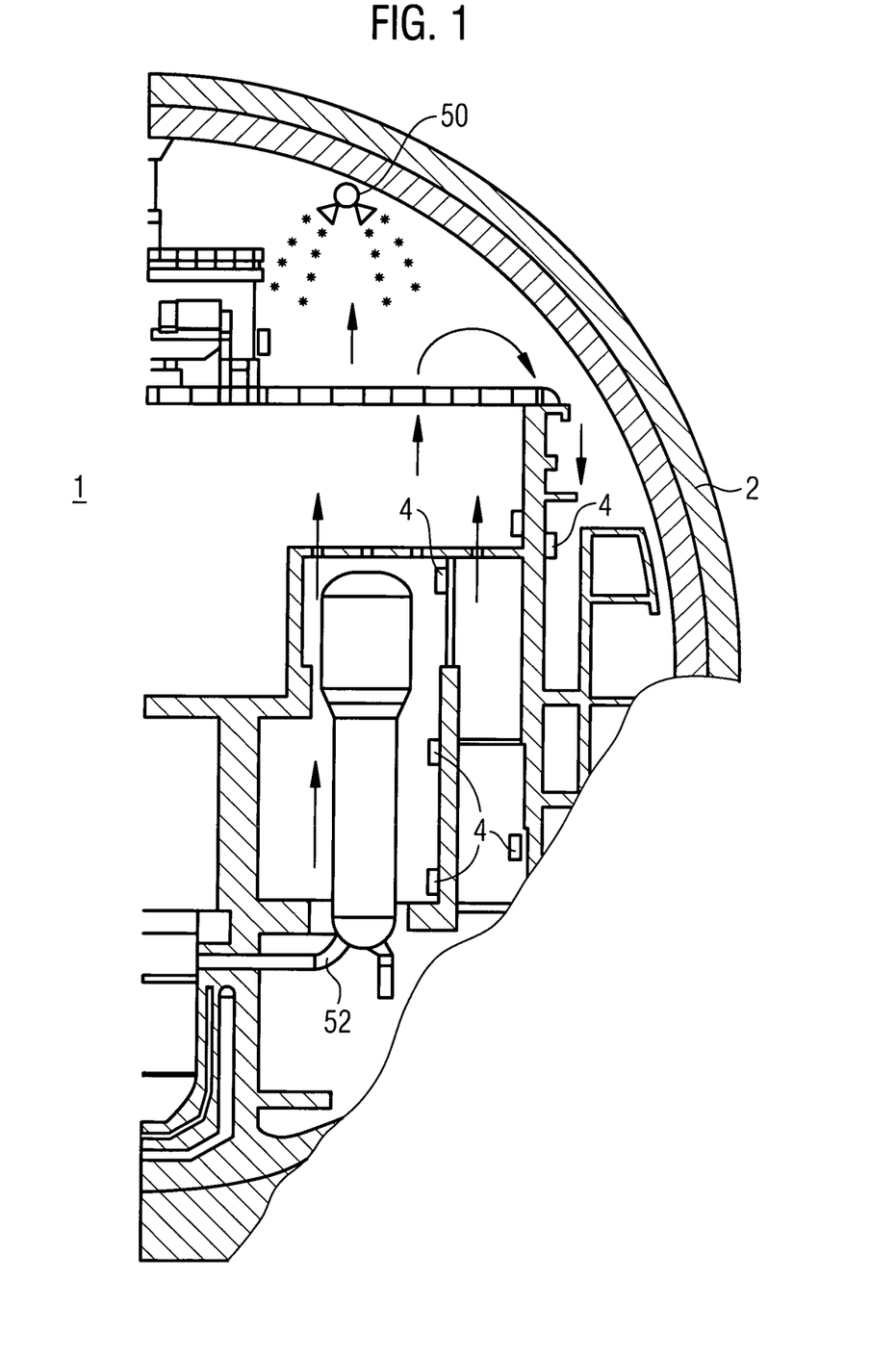
FIG. 1 is a fragmentary, diagrammatic, cross-sectional view of a safety system for recombination of hydrogen and oxygen in a gas mixture.

Referring now in detail to the figures of the drawing, in which like parts are provided with like reference numerals, and first, particularly, to FIG. 1 thereof, there is seen a safety system 1 that is provided for the recombination of hydrogen in a gas mixture, namely in the containment atmosphere of a nuclear plant safety containment 2, parts of which are shown in FIG. 1. The safety system 1 includes, for this purpose, a number of catalytic recombiners 4 disposed within the safety containment 2, each of which catalytically triggers a recombination reaction of hydrogen, which is entrained in a passing gas flow, with oxygen contained in the containment atmosphere.

Figure 2:
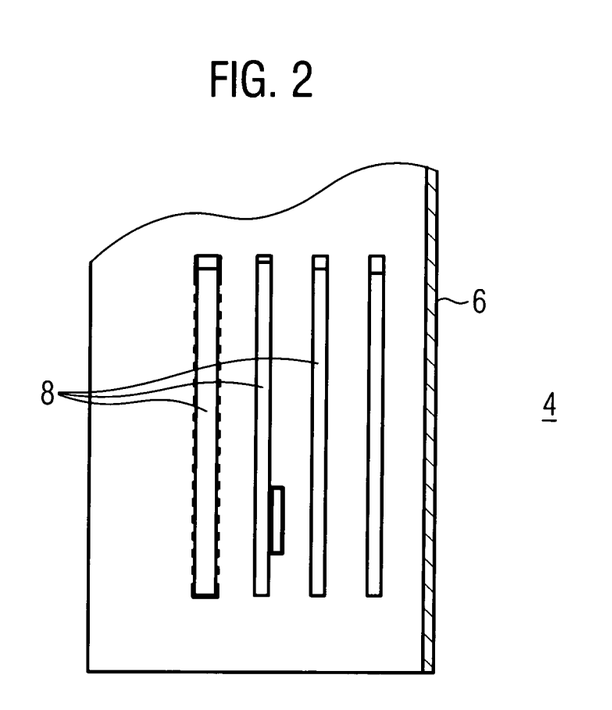
FIG. 2 is an enlarged, fragmentary, sectional view of a catalytic recombiner.

As may be seen in the enlarged illustration in FIG. 2, each of the catalytic recombiners 4 includes a number of catalyst or catalytic converter elements 8 disposed in a housing 6 for this purpose. The catalyst elements 8 in this case each have a surface which is provided with a suitably selected material, for example palladium and/or platinum, and triggers a catalytic recombination reaction with oxygen contained in the atmospheric gas in an adjoining gas mixture, should this gas mixture contain significant hydrogen contents of, for example, a few percent by volume. In this case, the hydrogen undergoes an exothermic reaction with the oxygen, forming water. As a result of this exothermic reaction, the catalyst elements 8 are for their part heated, so that a downward convection current is produced in the surrounding gas chamber as a consequence of the resulting temperature gradient.

In order to support this convection current by way of the so-called chimney effect, the housing 6, surrounding the catalyst elements 8, of the respective recombiner 4 is configured in a suitable manner, in particular in a chimney-like manner, and the catalyst elements 8 are embodied in a substantially plate-like manner and disposed parallel to one another in order to further facilitate the resulting convection current. Overall, the recombiner 4 formed from these components thus has structural properties which automatically start a catalytic recombination process when hydrogen is present in the atmospheric gas of the safety containment 2 and maintain the process as a result of the supporting effect of the convection current as a consequence of the chimney effect and cause a further thorough mixing of the atmosphere until sufficient degradation of the hydrogen has taken place.

The safety system 1 is constructed in its entirety to ensure safe and reliable recombination of the hydrogen which may in this case be generated in the atmosphere of the safety containment 2 in a large number of possible malfunction scenarios, including even comparatively improbable extreme malfunction conditions. For this purpose, the safety system 1 for the degradation of hydrogen is constructed with the focus on catalytic recombination, and an ignitable gas mixture is also in addition to be ignited as required and in particular locally and globally. For this purpose, the catalytic recombiners 4 are configured with regard to their type and positioning and the dimensioning of their components predominantly in such a way that in gas mixtures having a hydrogen concentration of up to about 6 percent by volume, or if required even up to about 8 percent by volume, no ignition takes place. Instead, the hydrogen degradation is caused by the catalytically triggered recombination reaction at the surface of the catalyst elements 8.

For higher hydrogen concentrations, on the other hand, provision is also made for the catalyst elements 8 to be heated as a consequence of the thermal energy released by the catalytic combination reaction in such a way that their temperature is, in the manner of so-called hotspots, above the ignition temperature of the gas mixture and an ignition of the gas mixture, automatically triggered in the manner of a passive system, thus assists the recombination process.

However, in order to prevent undesired crosstalk or cross feed of ignition events between individual recombiners 4 and unstable flow conditions possibly resulting therefrom with long flame acceleration paths and the like, the recombiners 4 and the flow paths connecting them are configured in a purposefully suitable manner in this structure. In particular, this makes allowance for the fact that, as may be seen from the enlarged detailed view of FIG. 3, an ignition triggered in a first recombiner 40 intentionally or accidentally, actively initiated or triggered by an external event such as, for example, a burst of steam or the like, generates a flame front 42 which spreads over time in the manner of a pulse. It may be problematic if this flame front 42 spreads to a further recombiner 44 disposed downstream on the flow side and triggers an ignition there by way of resulting additional heat introduced into the gas mixture. That is to say, with such triggering induced by a flame front, the undesired crosstalk or cross feed effects with flame acceleration, counterflows and the like might result.

Figure 3:
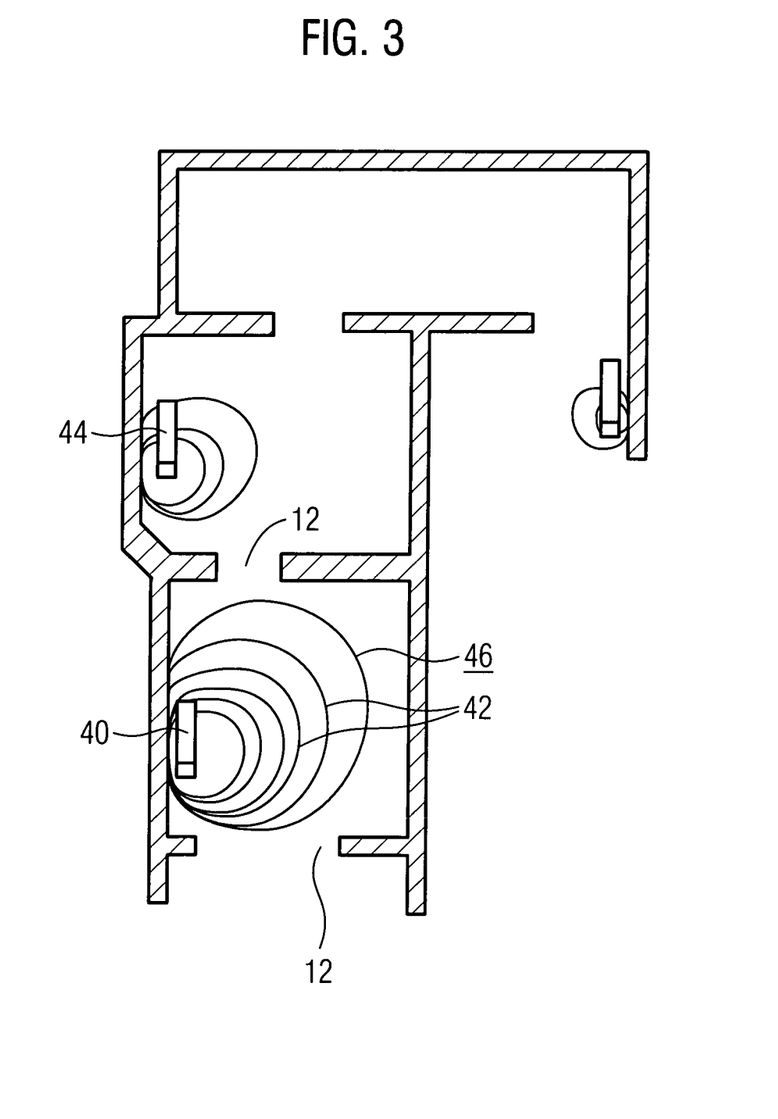
FIG. 3 is an enlarged, fragmentary, sectional view of a part of the safety system according to FIG. 1.

In order to counteract such an occurrence, the safety system 1 purposefully draws on the finding that the flame front 42 triggered in the first recombiner 40 by ignition is preceded by a pressure wave 46 in the manner of a gas displacement process, which thus reaches the further recombiner 44 that is connected downstream on the flow side, even before the flame front 42. In order to provide the desired high safety standard while avoiding the aforementioned crosstalk or cross feed effects, the safety system 1 is constructed to cause this pressure wave 46 to trigger the ignition in the recombiner 44 which is connected downstream on the flow side.

In order to ensure this, the safety system 1 makes allowance for the finding that the gas flow requiring treatment flows around each of the recombiners 4 in a catalytic recombination mode, i.e. by natural convection, with the hydrogen content of the gas flow being enriched in direct proximity to the catalytic surfaces of the catalyst elements 8 as a consequence of the recombination reaction as it proceeds. In the natural convection state, the catalyst elements 8 are thus directly contacted by the depleted gas in the manner of a layered gas flow, with the more remote spatial regions containing non-depleted gas having a correspondingly increased hydrogen content. In this natural convection state, the ignition effect that the heated catalyst material can exert on the surrounding gas flow is thus reduced by the depleted gas layer.

In order to purposefully utilize the effect of the gas displacement processes or the arriving pressure wave 46 in the inflow region of the recombiner 44 connected downstream, the flow path or the recombiner configuration in the flow path between the recombiners 4 is in each case configured in such a way that the incoming pressure wave in the inflow region of the respective recombiner 4 has flow rates of at least a predefinable minimum rate, for example of 5 m/s, preferably of at least 10 m/s. This can, for example, be achieved by providing suitable spatial blocking points, restriction points, orifices or the like in the flow path, as indicated in FIG. 3 by a constriction location 12. As a result of the appropriately set gas flow velocity of the arriving pressure wave, the gas layers formed in a natural convection mode, in particular an impoverishment zone close to the surface, are broken up, and gas having a non-depleted hydrogen content enters into direct contact with the surface of the respective catalyst element 8.

With regard to their material selection, plate thickness and other structural properties and taking into account the cooling effect of the passing gas flow, the respective catalyst elements 8 in this case are constructed in such a way that in the natural convection mode, taking into account the gas layer which spreads along the surface and has a depleted hydrogen content, the heating resulting from the exothermic recombination reaction leads to temperatures which do not lead to ignition of the gas mixture, but trigger an ignition on contact with non-depleted gas. Non-depleted gas, which is brought into contact with the hot surface of the catalyst element 8 by the arriving pressure wave, is thus ignited, so that the ignition is triggered in a controlled manner as a result of the suitable setting of the gas velocity before the arrival of the flame front 42.

The safety system 1 further includes a building spray system 50 through which an inerting agent can, if required, be sprayed into the safety containment 2. In this case, the exemplary embodiment makes provision for spraying in water as required, which immediately evaporates once it has been sprayed in, in view of the temperatures prevailing in the as-constructed safety containment 2. The steam which is formed in this case then inerts the atmosphere in the safety containment 2. As may be seen from the illustration according to FIG. 1, the building spray system 50 is also disposed, like a plurality of the recombiners 4, above a main circuit 52 of the nuclear plant.

The building spray system 50 is suitably adapted to the recombiners 4 with regard to the specification of its activation. In particular, the aforementioned criteria are taken into account with regard to the triggering of the spraying-in process.

The invention claimed is:

1. A safety system for a nuclear plant, the safety system comprising:
   a plurality of catalytic recombiner elements each for triggering a recombination reaction with oxygen upon hydrogen being entrained in onflowing gas flows of a gas medium;
   said recombiner elements being configured to act as ignition elements and to create a pressure pulse in the gas medium resulting from an ignition during the recombination reaction;
   said recombiner elements being interconnected by flow paths and including a first recombiner element and a second adjacent recombiner element; and
   said recombiner elements and said flow paths each being configured to cause the pressure pulse of said first recombiner element:
      to trigger a gas displacement process preceding a flame front,
      to have a flow rate of at least 5 m/s, and
      to cause intensified heating of said second recombiner element and as a result an ignition of the gas flow even before the flame front reaches said second recombiner element.

2. The safety system according to claim 1, wherein the flow rate for the triggered gas displacement process is predefined as at least 10 m/s.

3. The safety system according to claim 1, wherein at least one of said recombiner elements is constructed to trigger an ignition in a circulating gas flow in a natural convection mode only when a content of entrained hydrogen is at least 6% by volume.

4. The safety system according to claim 1, wherein at least one of said recombiner elements is constructed to trigger an ignition in a circulating gas flow in a natural convection mode only when a content of entrained hydrogen is at least 8% by volume.

5. The safety system according to claim 1, which further comprises a building spray system.

6. The safety system according to claim 5, wherein said building spray system injects water as required.

7. The safety system according to claim 5, wherein said recombiner elements and said building spray system are adapted to one another to initially form high-temperature target ignition zones and then carry out steam deinerting, in the event of a response.

8. A nuclear plant, comprising a safety system according to claim 1.

9. The safety system according to claim 1, wherein said recombiner elements and said flow paths are configured such that the velocity of the gas flow of the pressure pulse is more than twice as high as the gas flow velocity present in a convection operating mode.

* * * * *